United States Patent
Kapinos et al.

(10) Patent No.: US 9,939,874 B2
(45) Date of Patent: Apr. 10, 2018

(54) SELECTIVELY DISABLING SENSORS AND ASSOCIATED FUNCTIONS

(71) Applicant: Lenovo (Singapore) Pte. Ltd., Singapore (SG)

(72) Inventors: Robert James Kapinos, Durham, NC (US); Axel Ramirez Flores, Cary, NC (US); Suzanne Marion Beaumont, Wake Forest, NC (US); James Anthony Hunt, Chapel Hill, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 124 days.

(21) Appl. No.: 14/089,956

(22) Filed: Nov. 26, 2013

(65) Prior Publication Data
US 2015/0145641 A1    May 28, 2015

(51) Int. Cl.
G06F 1/32      (2006.01)
G06F 21/81    (2013.01)
G06F 9/44      (2018.01)

(52) U.S. Cl.
CPC .......... *G06F 1/3215* (2013.01); *G06F 1/3287* (2013.01); *G06F 9/4418* (2013.01); *G06F 21/81* (2013.01); *Y02B 60/1282* (2013.01)

(58) Field of Classification Search
CPC .......... G06F 1/32; G06F 21/81; G06F 9/4418; G06F 9/442
USPC .............................. 340/539.22, 539.26, 4.34
See application file for complete search history.

(56) References Cited

U.S. PATENT DOCUMENTS

| | | | | |
|---|---|---|---|---|
| 8,548,608 B2* | 10/2013 | Perek | .................... | G06F 1/1618 463/39 |
| 2007/0257800 A1* | 11/2007 | Yang | .................... | A61N 1/08 340/572.7 |
| 2008/0211774 A1* | 9/2008 | Woo | .................... | G06F 3/03543 345/166 |
| 2008/0234935 A1* | 9/2008 | Wolf | .................... | G01C 21/16 701/472 |
| 2009/0182986 A1 | 7/2009 | Schwinn et al. | | |
| 2009/0218957 A1* | 9/2009 | Kraft | .................... | G06F 1/3203 315/291 |
| 2010/0279627 A1* | 11/2010 | Bradley | .................... | H04M 1/72577 455/69 |

(Continued)

FOREIGN PATENT DOCUMENTS

| | | |
|---|---|---|
| CN | 1424667 A | 6/2003 |
| CN | 102265242 A | 11/2011 |
| CN | 102818913 A | 12/2012 |

OTHER PUBLICATIONS

"Sensor Fusion" Kionix, available at: www.kionix.com/sensor-fusion, last accessed Nov. 25, 2013, 3 pages.

*Primary Examiner* — Thomas Alunkal
(74) *Attorney, Agent, or Firm* — Ference & Associates LLC (57) ABSTRACT

An embodiment provides a method, including: receiving, at an information handling device, input of a sensor; mapping, using a processor, the sensor input to a sensor disabling condition; selecting, using a processor, a sensor based on the mapping; and disabling, using a processor, the sensor according to the sensor disabling condition. Other aspects are described and claimed.

20 Claims, 4 Drawing Sheets

(56) References Cited

U.S. PATENT DOCUMENTS

| | | | |
|---|---|---|---|
| 2011/0250928 A1* | 10/2011 | Schlub | H01Q 1/243 |
| | | | 455/550.1 |
| 2011/0260865 A1* | 10/2011 | Bergman | G01V 15/00 |
| | | | 340/568.1 |
| 2011/0306297 A1* | 12/2011 | Chang | H04B 1/3805 |
| | | | 455/41.2 |
| 2012/0147531 A1* | 6/2012 | Rabii | H04W 52/0254 |
| | | | 361/679.01 |
| 2013/0051427 A1* | 2/2013 | Wang | H04N 5/232 |
| | | | 374/152 |
| 2013/0051428 A1* | 2/2013 | Wang | G01K 7/015 |
| | | | 374/152 |
| 2013/0121367 A1 | 5/2013 | Ahuja et al. | |
| 2013/0232280 A1 | 9/2013 | Perek et al. | |
| 2014/0146644 A1* | 5/2014 | Chen | G08C 17/02 |
| | | | 367/197 |

* cited by examiner

SELECTIVELY DISABLING SENSORS AND ASSOCIATED FUNCTIONS

BACKGROUND

Information handling devices ("devices"), for example laptop computers, tablet computers, desktop computers, smart phones, etc., may have incorporated therewith different sensors. For example, a device may include some or all of an ambient light sensor, a camera, a microphone, an accelerometer, a lid positional sensor, a fingerprint reader, a device orientation sensor, a near field communication sensor, a wireless antenna, a temperature sensor, and a humidity sensor, and/or additional sensors.

In order to utilize the sensors in advantageous ways, devices often include a sensor fusion module. The sensor fusion module ("fusion module") provides logic (e.g., in software) that fuses or combines sensor inputs, e.g., from two or more sensors, to improve application performance over and above what either sensor input may produce individually. For example, inputs of two sensors may be used to refine or correct individual sensor inputs. In other words, the fused sensor input is synergistic in the sense that the fused input is often more useful than the combined, separate inputs of the two sensors. This fusion process may be extended (i.e., to more than two sensors). In a specific example, fused sensor inputs of two sensors, e.g., a dynamometer and a gyrometer, may have their inputs fused to more accurately determine whether the device is stationary, is being carried, to determine its attitude/orientation, etc. The fused output may thus be provided to various applications that rely on this data, e.g., screen re-orienting application.

BRIEF SUMMARY

In summary, one aspect provides a method, comprising: receiving, at an information handling device, input of a sensor; mapping, using a processor, the sensor input to a sensor disabling condition; selecting, using a processor, a sensor based on the mapping; and disabling, using a processor, the sensor according to the sensor disabling condition.

Another aspect provides an information handling device, comprising: a sensor; a processor; and a memory that stores instructions that are executed by the processor to: receive input of a sensor; map the sensor input to a sensor disabling condition; select a sensor based on the mapping; and disable the sensor according to the sensor disabling condition.

Another aspect provides a product, comprising: a device readable storage device having device readable code stored therewith, the device readable code comprising: code that receives, at an information handling device, input of a sensor; code that maps, using a processor, the sensor input to a sensor disabling condition; code that selects, using a processor, a sensor based on the mapping; and code that disables, using a processor, the sensor according to the sensor disabling condition.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Fusion modes are useful but consume a lot of battery power and processing resources, often unnecessarily, e.g., when a sensor's inputs cannot be put to good use. In addition, some fusion functions are fragile, e.g., certain sensors (including related components) may be harmed or provide inaccurate inputs if used in certain situations. Lastly, in certain contexts, e.g., movement of the computer, it is likely some fusion activities (e.g., gesture control) will be executed accidentally and out of context, further consuming system resources unnecessarily.

Current approaches to power management, including the fusion module and sensors providing input thereto, consist of managing the global system power state. The drawbacks with such a global approach include but are not necessarily limited to the management being all or nothing; relying on power management schemes geared toward or designed with other device components of the system in mind; and depending entirely on global or system-wide triggers, e.g., configuration ("lid") sensors.

Accordingly, an embodiment provides a fusion module that manages sensors based on the context of device state as sensed via sensor inputs. For example, two or more sensors, e.g., a dynamometer and a gyrometer, provide inputs to the fusion module. These inputs may be used by the fusion module to provide outputs that are used by applications running on the device, e.g., which make changes based on whether the device is stationary, being carried, etc. Additionally, the fusion module may receive inputs of other sensors, e.g., a lid positional sensor and/or fold state sensors, to determine which specific cameras, microphones, etc. are available or likely to be used.

If the system is in some particular state, e.g., an orientation where a specific fusion function is unavailable, that fusion input may be disabled, e.g., disabling or powering off a sensor and/or subcomponent thereof associated with the fusion input. As another example, if the device is in another state, e.g., some attitude/orientation where a sensor is unavailable (e.g., camera pointed down), functions using that sensor may be disabled by the fusion module.

Additionally or in the alternative, for a particular device state, some sensors that have a high fragility factor (e.g., are sensitive to a particular use environment, are at risk of being damaged, etc., and/or the functions that use them) may be disabled or locked down until the device is removed from the condition, e.g., until movement is safe for use of such sensors, until the use environment is safe or suitable for use of such sensors, etc.

Therefore, according to an embodiment, sensor inputs may be received at the fusion module from a variety of sensors. The fusion module may map the sensor inputs to a sensor disabling condition, e.g., a sensor at risk or fragility condition and/or a sensor non-use condition. If the sensor inputs are successfully mapped to such a sensor disabling condition, the fusion module may select the appropriate sensor disabling condition based on the mapping and thereafter disable a sensor (including sensor sub-components and/or components associated with a sensor) to more appropriately manage device resource usage (e.g., power state) and/or to protect sensors from conditions that may place them at risk of being damaged or utilized inappropriately, e.g., under conditions that are sub-optimal.

The illustrated example embodiments will be best understood by reference to the figures. The following description is intended only by way of example, and simply illustrates certain example embodiments.

Figure 1:
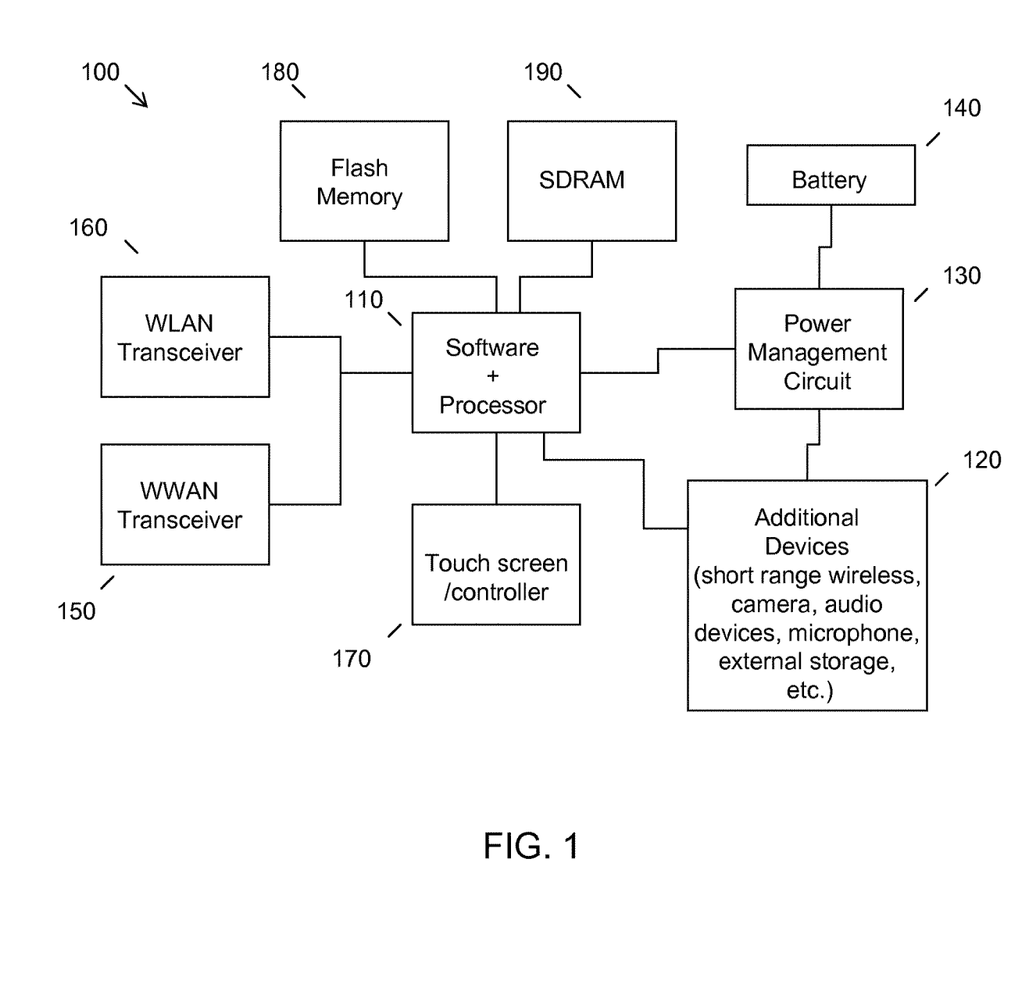
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 may be included, for example sensors such as an ambient light sensor, a camera, a microphone, an accelerometer, a lid positional sensor, a fingerprint reader, a device orientation sensor, a near field communication sensor, a wireless antenna, a temperature sensor, and a humidity sensor, as further described herein. Commonly, system 100 will include a touch screen 170 for data input and display/rendering. System 100 also typically includes various memory devices, for example flash memory 180 and SDRAM 190.

Figure 2:
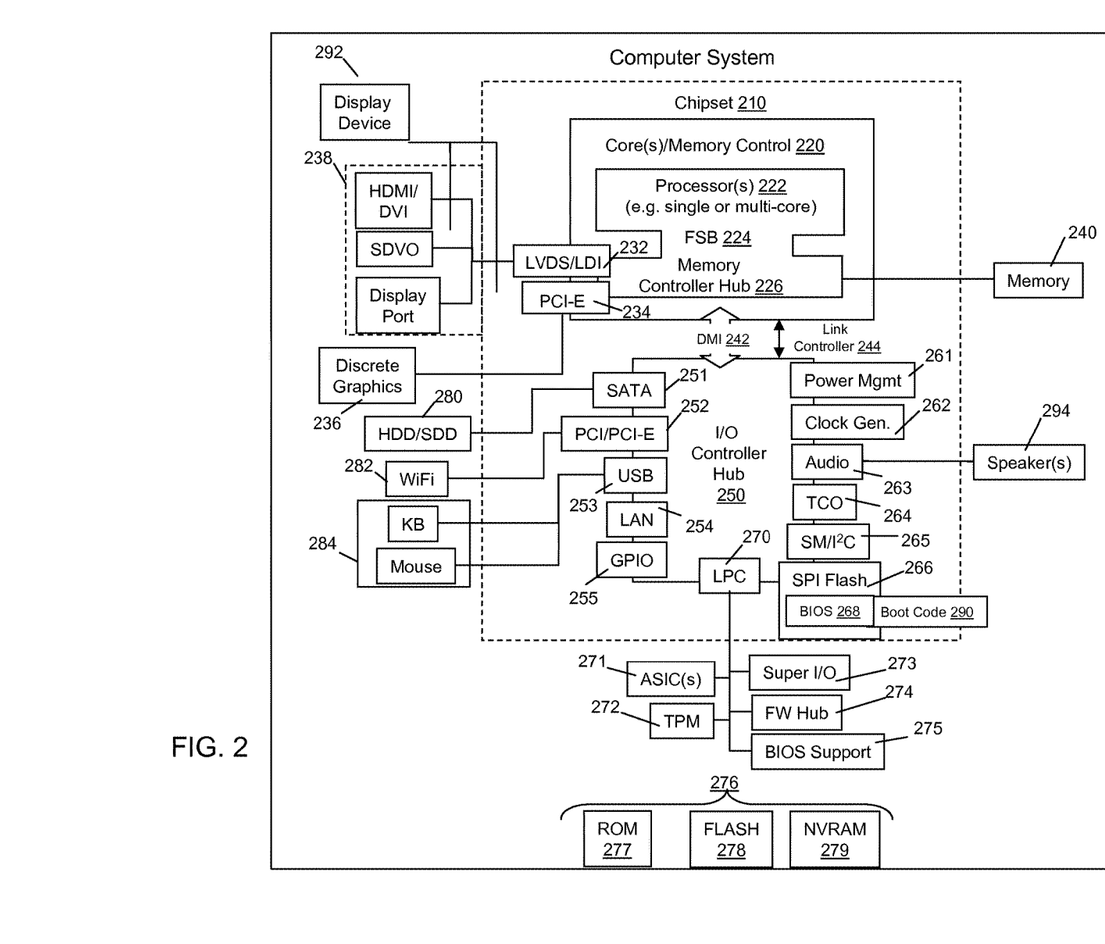
FIG. 2 illustrates another example of an information handling device.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, phones, storage, sensors such as an ambient light sensor, a camera, a microphone, an accelerometer, a lid positional sensor, a fingerprint reader, a device orientation sensor, a near field communication sensor, a wireless antenna, a temperature sensor, and a humidity sensor, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in connection with a tablet device, a notebook or laptop computer, etc. For example, a device having circuitry such as outlined in FIG. 1 may be used in tablet computer and may operate a fusion module to manage various sensor inputs for use by applications running on the tablet device, as further described herein. Similarly, a device including circuitry as outlined in FIG. 2 may be used in a larger device, such as a laptop or desktop computer, and may likewise contain a fusion module, as further described herein.

Figure 3:
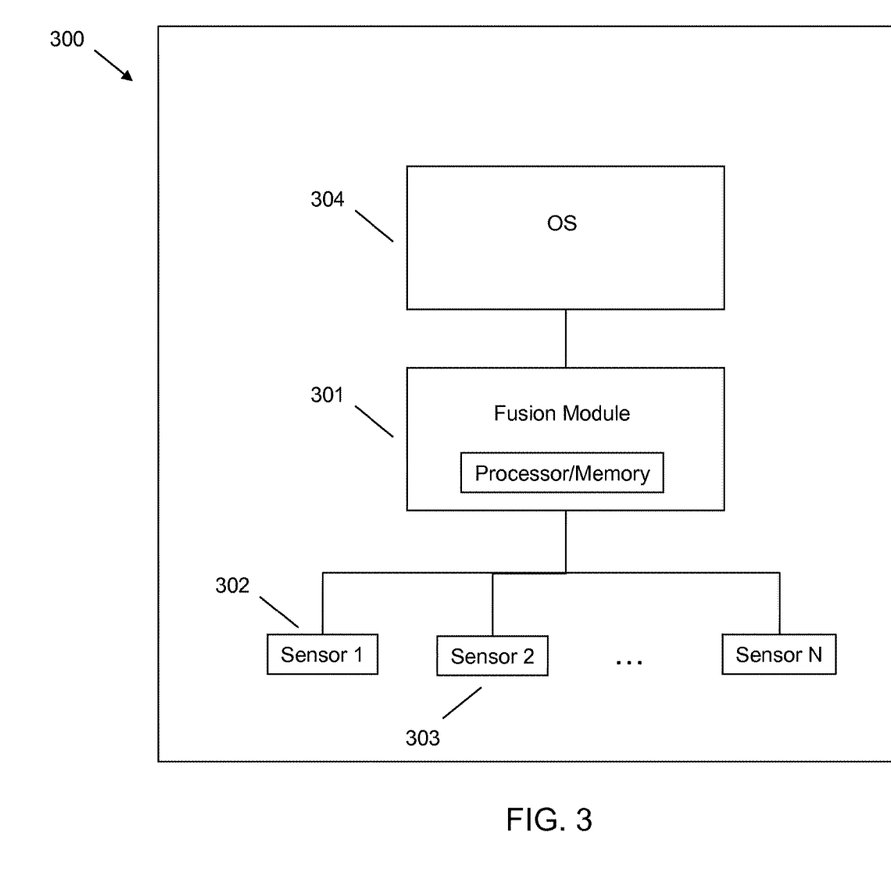
FIG. 3 illustrates an example device having an example fusion module.

Turning to FIG. 3, an example of a device 300 including a fusion module 301 is illustrated. As illustrated, the fusion module 301 may include a processor and memory (e.g., microprocessor and supporting memory) such that the fusion module, in addition to performing the functions related to combining sensor inputs from the sensors, e.g., sensor 302, 303, may perform sensor management functions, as further described herein.

The fusion module 301 receives inputs from various sensors, e.g., sensor 302, 303, and combines or fuses these inputs to provide outputs to various applications, e.g., running in an operating system 304 of the device 300. While not illustrated in FIG. 3, other components may be included in device 300, e.g., various drivers for sensors, etc., for example facilitating the providing of sensor inputs to the fusion module 301. The fusion module 301 therefore may receive and analyze various inputs to determine a device state, usage condition, etc. For example, fusion module 301 may receive inputs from a lid positional sensor and a fold state sensor to determine that a clamshell style device is closed.

According to an embodiment, the fusion module 301 may analyze or map such sensor inputs to provide intelligent sensor management. For example, in a case where the fusion module 301 receives sensor inputs indicating that a particular sensor, e.g., a camera integrated into the lip of a lid of a clamshell style laptop, is not capable or likely to be used given the current device state, e.g., closed, the fusion module 301 may map various sensor inputs into predetermined sensor disabling conditions such that, on receipt of appropriate sensor inputs mapping to a sensor disabling condition, one or more sensor management actions may be implemented.

Figure 4:
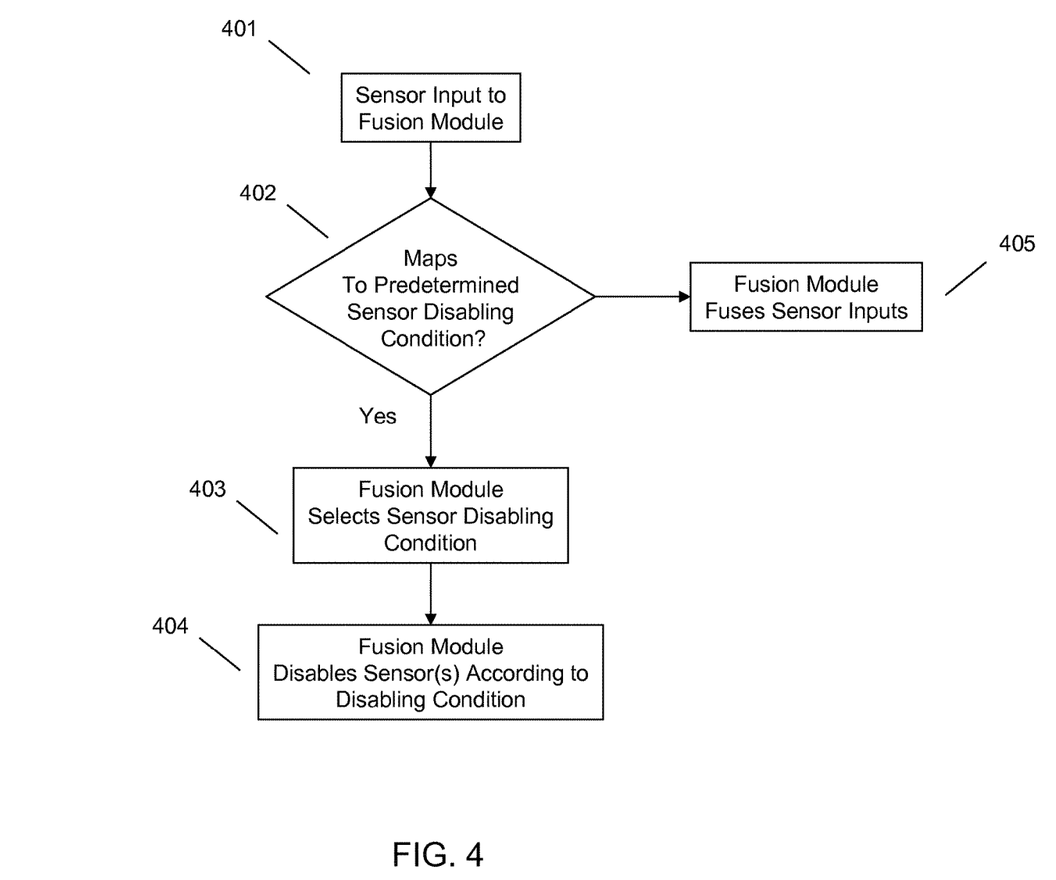
FIG. 4 illustrates example method of selectively disabling sensors and associated functions.

In this regard, referring to FIG. 4, sensors provide inputs to the fusion module at 401 that may be mapped by the fusion module at 402 to one of a set of predetermined sensor disabling conditions. If the fusion module maps a sensor input pattern (which may include a single sensor's inputs or multiple sensors' inputs) to a sensor disabling condition, e.g., sensor at risk, sensor non-use, etc., the fusion module may thereafter select the appropriate sensor disabling condition (e.g., a predetermined instruction set for execution) at 403 and thereafter implement it, e.g., disabling a sensor at 404. If the fusion module does not detect a sensor disabling condition, e.g., none of the predetermined sensor disabling conditions map to the sensor inputs received, the fusion module may continue to operate as normal, e.g., fuse or combine sensor inputs at 405.

As an example, a sensor disabling condition may include a sensor non-use condition. This may be associated with a device state, e.g., particular conformation, particular usage state, etc., sensed via one or more sensor inputs. By way of example, device conformation may be sensed via a lid positional sensor. Using such sensor inputs, the fusion module may map the sensor inputs to a predetermined sensor disabling condition, e.g., device state=closed; on board camera→power off. As such, the fusion module itself may implement the sensor disabling condition instruction set to power off the sensor in question, e.g., the on board camera in this example. This modification or management of the sensor indicated by the fusion module may be implemented in a variety of ways. For example, the fusion module may act to directly manage the sensor in question and/or the fusion module may send an indication to another component, e.g., the device operating system, that the sensor in question is to be powered off, placed in a low power state, etc.

As another example, a sensor disabling condition may include a sensor risk condition. This may be associated with a device state, e.g., particular usage environment, etc., sensed via one or more sensor inputs. By way of example, device usage environments, e.g., moisture/humidity, repeated acceleration/deceleration, high electronic/magnetic field present, low temperature, etc., may be sensed via a moisture sensor, an accelerometer, a BLUETOOTH short range wireless radio, and a thermometer, respectively. Using such sensor inputs, or combinations thereof, the fusion module may map the sensor inputs to a predetermined sensor disabling condition, e.g., device state=high electronic/magnetic field present; wireless antenna→power off. As such, the fusion module itself may implement the sensor disabling condition instruction set to power off the sensor in question, e.g., the wireless antenna in this example, to protect it from the risk posed by the usage environment. Again, this modification or management of the sensor indicated by the fusion module may be implemented in a variety of ways.

Accordingly, an embodiment provides a fusion module with the ability to selectively disable sensors and associated functions or device components using the sensor inputs received at the fusion module. This allows the fusion module itself to manage the sensors, rather than relying on instructions (global or specific) derived from another device component, e.g., operating system. As such, an embodiment may include a fusion module as a sub-system that is powered independently of the main device such that the fusion module or sub-system may be in an always-on condition. This permits the fusion module to appropriately manage the sensor(s) of the device in question without relying on other components, e.g., operating system, which may not be active when sensor management is needed.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable storage medium(s) may be utilized. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a sub-system of an information handling device, input of a sensor, wherein the sub-system is active independently from at least an operating system of the information handling device;
   mapping, using a processor, the sensor input to a damage risk condition, wherein the damage risk condition identifies potential damage to at least one component of the information handling device based upon an identified device usage environment;
   selecting, using a processor, a sensor based on the damage risk condition; and
   disabling, using a processor, the sensor according to the damage risk condition.

2. The method of claim 1, wherein said mapping further comprises mapping the sensor input to a sensor disabling condition.

3. The method of claim 1, wherein:
   the sensor risk condition comprises a predetermined electromagnetic field environment;
   the sensor providing input a short range wireless antenna; and
   the sensor known to be a risk according to the sensor disabling condition includes a wireless subsystem component.

4. The method of claim 1, wherein:
   receiving comprises receiving a plurality of sensor inputs; and
   said mapping comprises mapping two or more sensor inputs to a sensor damage risk condition.

5. The method of claim 4, wherein the plurality of sensor inputs are produced from two or more sensors selected from the group of sensors consisting of an ambient light sensor, a camera, a microphone, an accelerometer, a lid positional sensor, a fingerprint reader, a device orientation sensor, a near field communication sensor, a wireless antenna, a temperature sensor, and a humidity sensor.

6. The method of claim 2, wherein the sensor disabling condition comprises a condition selected from the group of conditions consisting of a sensor non-use condition and a sensor risk condition.

7. The method of claim 6, wherein said mapping comprises mapping a predetermined set of sensor input characteristics to a sensor non-use condition;
   said disabling comprising disabling a sensor known to not be in use according to the sensor non-use condition.

8. The method of claim 6, wherein:
   the sensor non-use condition comprises a lid closed condition of the information handling device;
   the sensor providing input is a lid positional sensor; and
   the sensor known to not be in use includes a camera integrated in a lid of the information handling device.

9. An information handling device, comprising:
   a sensor;
   a processor; and
   a memory that stores instructions that are executed by the processor to:
   receive input of a sensor at a sub-system of the information handling device, wherein the sub-system is active independently from at least an operating system of the information handling device;

map the sensor input to a damage risk condition, wherein the damage risk condition identifies potential damage to at least one component of the information handling device based upon an identified device usage environment;

select a sensor based on the damage risk condition; and disable the sensor according to the damage risk condition.

10. The information handling device of claim 9, wherein:

to map comprises mapping a predetermined set of sensor input characteristics to a sensor risk condition; and to disable comprises disabling a sensor known to be at risk according to the sensor risk condition.

11. The information handling device of claim 9, wherein:

the sensor risk condition comprises a predetermined electromagnetic field environment;

the sensor providing input is a short range wireless antenna; and the sensor known to be a risk according to the sensor disabling condition includes a wireless subsystem component.

12. The information handling device of claim 9, wherein:

to receive comprises receiving a plurality of sensor inputs; and said mapping comprises mapping two or more sensor inputs to a damage risk condition.

13. The information handling device of claim 12, wherein the plurality of sensor inputs are produced from two or more sensors selected from the group of sensors consisting of an ambient light sensor, a camera, a microphone, an accelerometer, a lid positional sensor, a fingerprint reader, a device orientation sensor, a near field communication sensor, a wireless antenna, a temperature sensor, and a humidity sensor.

14. The information handling device of claim 10, wherein the sensor disabling condition comprises a condition selected from the group of conditions consisting of a sensor non-use condition and a sensor risk condition.

15. The information handling device of claim 14, wherein:

to map comprises mapping a predetermined set of sensor input characteristics to a sensor non-use condition; and to disable comprises disabling a sensor known to not be in use according to the sensor non-use condition.

16. The information handling device of claim 14, wherein:

the sensor non-use condition comprises a lid closed condition of the information handling device;

the sensor providing input is a lid positional sensor; and the sensor known to not be in use includes a camera integrated in a lid of the information handling device.

17. A product, comprising:

a storage device having device readable code stored therewith, the device readable code being executable by a processor and comprising:

code that receives, at a sub-system of an information handling device, input of a sensor, wherein the sub-system is active independently from at least an operating system of the information handling device;

code that maps, using a processor, the sensor input to a damage risk condition, wherein the damage risk condition identifies potential damage to at least one component of the information handling device based upon an identified device usage environment;

code that selects, using a processor, a sensor based on the damage risk condition; and code that disables, using a processor, the sensor according to the damage risk condition.

18. The method of claim 1, wherein:

the input of the sensor that is received comprises a plurality of inputs from a plurality of sensors;

the method further comprising:

mapping, using a processor, the plurality of sensor inputs to a device orientation;

determining, using a processor, that a fusion function is unavailable based on the device orientation;

selecting, using a processor, a fusion input based on the mapping; and disabling, using a processor, the fusion input.

19. The method of claim 1, wherein the damage risk condition is identified based upon input from a sensor other than the sensor selected for disabling.

20. The method of claim 1, wherein the receiving input comprises receiving input at the sub-system while the operating system is not active.

* * * * *